United States Patent [19]

Dzombak et al.

[11] Patent Number: 5,516,744

[45] Date of Patent: May 14, 1996

[54] ALUMINA CATALYSTS SUPPORT MANUFACTURE

[75] Inventors: David A. Dzombak; Cynthia R. Evanko, both of Pittsburgh, Pa.

[73] Assignee: Carnegie Mellon University, Pittsburgh, Pa.

[21] Appl. No.: 288,712

[22] Filed: Aug. 15, 1994

[51] Int. Cl.$^6$ ............... B01J 21/04; B01J 32/00
[52] U.S. Cl. ............. 502/355; 502/415; 502/439
[58] Field of Search ..................... 502/439, 355, 502/415

[56] References Cited

U.S. PATENT DOCUMENTS

| | | |
|---|---|---|
| 3,867,296 | 2/1975 | Hunt . |
| 4,301,037 | 11/1981 | Sanchez et al. . |
| 4,391,718 | 7/1983 | Reitz et al. . |
| 4,721,579 | 1/1988 | Kim . |
| 4,746,503 | 5/1988 | Barclay et al. ............ 423/630 |
| 4,898,685 | 2/1990 | Kanekiyo et al. . |
| 4,950,416 | 8/1990 | Baxter . |
| 5,039,550 | 8/1991 | Malghan et al. . |
| 5,051,386 | 9/1991 | Ward et al. ............ 502/64 |
| 5,059,367 | 10/1991 | Frankfurter . |
| 5,063,257 | 11/1991 | Akahane et al. . |
| 5,135,844 | 8/1992 | Bagchi et al. . |
| 5,279,755 | 1/1994 | Choy et al. . |
| 5,300,255 | 4/1994 | Campbell et al. . |

*Primary Examiner*—Anthony McFarland
*Attorney, Agent, or Firm*—Andrew Alexander

[57] ABSTRACT

Disclosed is a process for providing an improved catalyst support comprising the steps of providing a dispersion of alumina in water, the dispersion maintained under acidic conditions; adding a stabilizing agent to said dispersion, the stabilizing agent capable of stabilizing said dispersion and inhibiting gellation thereof, the stabilizing agent having the formula:

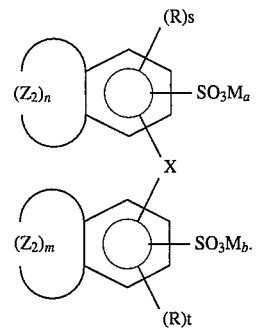

24 Claims, 2 Drawing Sheets

ALUMINA CATALYSTS SUPPORT MANUFACTURE

BACKGROUND OF THE INVENTION

This invention relates to alumina and products manufactured therefrom and more particularly, it relates to improved alumina catalyst supports and method of making stabilized alumina dispersions for forming into catalyst supports.

Alumina catalyst supports are made from concentrated dispersions of alumina powders in water. However, properties of such alumina catalyst supports can suffer as a result of poorly dispersed alumina. For example, alumina catalyst supports can have a less uniform pore structure and can have a surface roughness that can vary during extrusion of the dispersion. Such defects result in a less effective alumina catalyst. These problems often result from the colloidal instability and the related viscosity instability of concentrated alumina dispersions. That is, the viscosity of concentrated alumina powder dispersions can increase significantly as a result of particle aggregation or coagulation, and this can lead to non-uniformity problems in the catalyst support. Further, particle aggregation in concentrated alumina dispersions can result in gellation which can render the alumina dispersions useless.

In the extrusion of alumina dispersions that is performed in the manufacture of catalyst supports, some alumina dispersions will not extrude or extrude poorly, resulting in an extrudate that breaks or cracks during extrusion if the viscosity of the dispersion is not maintained within certain ranges. Also, various properties of the extrudate, such as the extrudate surface area and pore volume distribution, are affected by the stability and related properties of the alumina dispersion. Accordingly, there is a great need for an improved process for making catalyst supports utilizing stabilized alumina dispersions in order to provide for improved properties in the catalyst supports.

Briefly, alumina catalyst supports are manufactured from concentrated alumina dispersions by extruding, drying and firing. Such steps are set forth in U.S. Pat. No. 4,301,037, incorporated herein by reference.

Dispersants have been used in various applications including the manufacture of aluminum oxide tubes and dishwater detergents. For example, U.S. Pat. No. 5,059,367 discloses a process for the manufacture of aluminum oxide tubes involving grinding and spraying aluminum oxide wherein a first grinding of aluminum oxide is carried out until gas tightness can be achieved in later firing at 1720°–1769° C. Further, the patent discloses that this is achieved at a mean particle diameter below 15 μm, particularly from 2 to 5 μm. The spraying is preferably carried out after the addition of a binder that results in a uniform powder with only a small proportion of very fine material. The water soluble stabilizing agent is usually an organic compound which decomposes during the sintering process without leaving a residue. According to the patent, compounds that may be used for this purpose are polyvinyl alcohol, polyvinyl acetate dispersions or polyethylene glycol. Further, these compounds increase the viscosity of solutions and prevent the high-density aluminum oxide from settling out.

In preparing liquid dishwater detergents, an abrasive scouring cleanser containing bleach and aluminum oxide thickeners are employed. U.S. Pat. No. 5,279,755 discloses a thickened aqueous suspension that serves as an abrasive scouring cleanser containing bleach and stably suspended abrasives in an aqueous suspension comprising a colloidal aluminum oxide thickener and at least one surfactant which can, in association with aluminum oxide under alkaline conditions, provide proper theology and cleaning. The suspension includes an electrolyte, a halogen bleach, a particulate abrasive and a phase stabilizing amount of a multivalent metal salt of $C_{16-22}$ fatty acid. The surfactant is selected from anionic, bleach-stable nonionic, amphoteric, zwitterionic surfactants and preferred is a combination of anionics and bleach-stable nonionics. The anionic surfactants are selected from bleach-stable surfactants such as alkali metal alkyl sulfates, secondary alkane sulfonates, alkyl diphenyl ether disulfonates, fatty acids and mixtures thereof.

U.S. Pat. No. 4,950,416 discloses an aqueous thixotropic automatic dishwater detergent containing a thickener constituted from an alumina dispersion and a stabilizer consisting of either a long chain fatty acid, a metal salt of a long chain fatty acid or mixtures thereof. The dishwater detergent contains water, sodium silicate, alkali metal phosphate, chlorine bleach compound, a bleach stable, water-dispersible organic detergent active material, and a thickener consisting of an aqueous alumina dispersion with a stabilizer of a mixture of a long chain fatty acid and the polyvalent metal salt of a long chain fatty acid. The preferred surfactant is an alkyl diphenoloxide mono- and/or di-sulfonates.

U.S. Pat. No. 3,867,296 discloses a process for preparing clear bright oleaginous aluminum dispersions that involves admixing an oil-soluble dispersing agent, an oleaginous carrier and a volatile solvent with a dispersible alumina, and then heating and recovering the oleaginous aluminum dispersion. In U.S. Pat. No. 5,039,550, there is disclosed an alumina/water dispersion having a pH of 11 to which is added a polyacrylate dispersant at a concentration of about 0.1 wt. % of alumina powder. According to the patent, the polyacrylate dispersant is primarily in ionic form at the pH of the solution and the dispersant is attached to the alumina particles by hydrogen bonding between surface hydroxyl sites and carboxyl groups on the surfactant.

Other dispersants or surfactants are referred to in U.S. Pat. Nos. 5,300,255; 4,391,718; 4,721,579; 4,898,685; 5,063,257 and 5,135,844.

SUMMARY OF THE INVENTION

It is an object of the invention to provide improved alumina catalyst supports and process for making said supports.

Further, it is another object of the invention to provide an improved alumina/water dispersion maintained under acidic conditions having greatly extended shelf life suitable for use in making alumina catalyst supports.

It is another object of the invention to provide an improved alumina dispersion resistant to gellation.

Yet, it is another object of the invention to provide an improved alumina/water dispersion that is resistant to settling or formation of a sedimentation layer, such dispersion useful for extruding into catalyst supports.

Still, it is a further object of the invention to provide an improved process for forming an alumina/water dispersion improved by greater colloidal stability and viscosity stability.

These and other objects will become apparent from the specification and claims appended hereto.

In accordance with these objects there is provided an improved, stabilized, concentrated aqueous dispersion of alumina suitable for catalyst supports. The improved dispersion comprises alumina in water and a stabilizing agent, the stabilizing agent having the formula:

wherein:

X is selected from O (oxygen), S (sulfur), or $NR_1$ wherein N is nitrogen;

$Z_1$ and $Z_2$ are the atoms necessary to complete a substituted or unsubstituted aryl, carbocyclic or heterocyclic ring and may be the same or different;

R and $R_1$ are $C_yH_{2y+1}$, wherein y is an integer from 6 to 16, inclusive, and may be branched or unbranched, substituted or unsubstituted and when X is $NR_1$, R and $R_1$ may be the same or different;

s and t are individually 0, 1, 2, 3, or 4, wherein at least one of s and t is 1; and n and m are individually 0 or 1; and $M_a$ and $M_b$ are selected from mono, di, or trivalent metal atoms and may be the same or different, or hydrogen.

The invention also includes a process for stabilizing acidified aqueous dispersions of alumina with respect to coagulation and sedimentation, and/or inhibiting gellation of such dispersions which are useful in making catalyst supports. The process comprises the steps of providing a dispersion of alumina in water, the dispersion maintained under acidic conditions, and adding said stabilizing agent to the dispersion. When the dispersion is used to form catalyst supports, it is extruded to provide an extrudate which is then dried and fired (heated) to remove the stabilizing agent and to activate the alumina to provide desired catalyst support properties.

A preferred stabilizer has the formula:

wherein R is defined as above.

DETAILED DESCRIPTION OF THE PREFERRED EMBODIMENTS

In accordance with the invention, there is provided a stabilized alumina in water dispersion maintained under acidic conditions containing finely divided alumina and a stabilizing agent. There is also provided an aqueous alumina dispersion containing a stabilizing agent in which the sediment layer is resistant to gellation. By the term "sediment layer" is meant a layer of particles at the bottom of a suspension that forms when particles settle out of the suspension.

The alumina that may be used in the present invention can be any finely-divided, crystalline or pseudo-crystalline alumina capable of being dispersed in an aqueous solution. Typical of such alumina is pseudo-boehmite, gamma alumina, and other fine rehydratable aluminas such as flash-activated aluminas. In addition to alumina, this invention can be applied for stabilization of aqueous dispersions of other finely-divided metal oxide particles such as $ZrO_2$, $SiO_2$, $Fe_2O_3$, $MnO_2$, $TiO_2$, $Ce_2O_3$, or $La_2O_3$ individually or combined in certain proportions with the alumina referred to herein.

An example of alumina that may be used includes low density pseudo-boehmite available from LaRoche Chemicals Inc., Baton Rouge, La., under the designation VERSAL™ 250. Such alumina comprises about 73 to 77 wt. % boehmite, the remainder water and trace materials containing carbon, silicon, iron, sodium, chlorine and sulfur. This alumina has a surface area of about 320 $m^2$/gm, an average dispersed particle size of 2 to 3 microns, an acid dispersibility of about 12% by weight, a water content (loss on ignition at 1000° C.) of about 22 to 27% by weight, and a loose bulk density of 13 to 15 lbs/$ft^3$.

Another example of alumina that may be used includes a more finely-divided high-density pseudoboehmite available from LaRoche Chemicals, Inc. under the designation VERSAL™ 450. Such alumina comprises about 73 wt. % boehmite, the remainder water and trace materials containing carbon, silicon, iron, sodium, chlorine and sulfur. This alumina has a Surface area of about 300 $m^2$/gm, an average dispersed particle size of 1 to 2 microns, an acid dispersibility of about 55% by weight, a water content of about 27% by weight, and a loose bulk density of about 20 to 25 lbs/$ft^3$.

The particle size of the alumina used in the dispersion can range from less than 60 μm, preferably 1 to 20 μm for pseudo-boehmite. For finely divided hydrated alumina, the dispersed particle size is typically less than 1.5 μm, preferably in the range of 0.5 to 1.5 μm and typically 1 to 1.5 μm. For flash activated aluminas, such as VERSAL™ A-300 flash-activated alumina (LaRoche Chemicals, Inc., Baton Rouge, La.), the dispersed particle size range preferred is 1 to 45 μm, and the typical range is 3 to 20 μm.

Dispersions in accordance with the invention can contain 1 to 40 wt. % alumina, preferably 10 to 30 wt. % alumina, with typical amounts being in the range of 15 to 20 wt. % alumina.

In accordance with the invention, a stabilizing agent capable of stabilizing an alumina/water dispersion has the general formula:

wherein
X is selected from O (oxygen), S (sulfur), or $NR_1$ wherein N is nitrogen;

$Z_1$ and $Z_2$ are the atoms necessary to complete a substituted or unsubstituted aryl, carbocyclic or heterocyclic ring and may be the same or different;

R and $R_1$ are $C_yH_{2y+1}$, wherein y is an integer from 6 to 16, inclusive, and may be branched or unbranched, substituted or unsubstituted and when X is $NR_1$, R and $R_1$ may be the same or different;

s and t are individually 0, 1, 2, 3, or 4, wherein at least one of s and t is 1;

n and m are individually 0 or 1; and

$M_a$ and $M_b$ are selected from mono, di, or trivalent metal atoms and may be the same or different, or hydrogen.

In the stabilizing agent, X may be connected to the rings as follows:

$X, Z_1, Z_2, R, R_1$, s, t, n and m have the same meaning throughout.

In the following formula, $(R)_s$, $(R)_t$ and O are shown connected directly to the rings comprising the stabilizing agent.

In one embodiment of the invention, the stabilizing agent is comprised of benzene rings as follows:

Further, the benzene rings of the stabilizing agent may be joined by an oxygen atom O as follows:

In another embodiment, the oxygen and $(R)_s$ and $(R)_t$ are preferably joined to the benzene rings as follows:

In a typical embodiment, the stabilizing agent has the formula:

wherein R is $C_yH_{2y+1}$ and wherein y is an integer from 6 to 16, inclusive, and may be branched or unbranched, substituted or unsubstituted. Such stabilizing agents can be linear or branched alkali metal mono- and/or di-($C_8$-$C_{14}$) alkyl diphenyloxide disulfonates. Other stabilizing agents that may be used include alkyl sulfates, primary alkyl sulfates, sec-alkyl sulfates, alkylaryl sulfonates. Stabilizing agents such as sodium or potassium $C_{10}$–$C_{18}$ alkyl sulfates such as sodium or potassium dodecylsulfate; sodium or potassium $C_{10}$–$C_{18}$ alkanesulfonates, such as sodium or potassium hexadecyl-1-sulfonate and sodium or potassium dodecylbenzenesulfonate are further examples that may be used.

Typical dispersant compounds include decyl(sulfophenoxy)benzenesulfonic acid disodium salt; oxybis(decyl)benzenesulfonic acid disodium salt; para-hydroxy benzoic acid; para-amino benzoic acid; and other low molecular weight organic acids. Potassium or like metals may be substituted for the sodium in such dispersant compounds.

Suitable stabilizing agents useful in alumina dispersion may be obtained from Dow Chemical Company, Midland, Mich., under the designation Dowfax® 3B2, Dowfax® 2A1, Dowfax® 8390 (avg. MW=642; R group=$C^{16}$ alpha-olefin), Dowfax® 2EP (avg. MW=575; R=tetrapropylene), XDS 8174.00 (avg. MW=575; R=$C_{12}$ alpha-olefin), and XDS 8292.00 (avg. MW=474; R=$C_6$ alpha-olefin).

The amount of stabilizing agent added is an amount sufficient to prevent the alumina dispersion from coagulating, settling or gelling. Normally, the amount of dispersing agent required to stabilize a dispersion is $3\times10^{-5}$ to $1\times10^{-4}$ moles/gm alumina in the dispersion. Preferably, the amount of stabilizing agent used is in the range of $4\times10^{-5}$ to $7\times10^{-5}$ moles/gm of alumina in the dispersion, with typical amounts being in the range of $4.5\times10^{-5}$ to $5.5\times10^{-5}$ moles/gm of alumina. Lower amounts of the stabilizing agent are capable of inhibiting gellation without stabilizing the dispersion against sedimentation. The lower amounts of stabilizing agent which are suitable for inhibiting gellation are in the range of $1.5\times10^{-8}$ to $1.5\times10^{-5}$ moles/gm alumina, preferably in the range of $1.5\times10^{-8}$ to $1.5\times10^{-7}$ moles/gm.

The improved alumina dispersion in accordance with the invention is characterized by having a viscosity in the range of 5 to 25 cps, preferably 5 to 15 cps. Further, the improved alumina dispersion can maintain this viscosity range for a period in the range of 1 to 6 days or more. It will be appreciated that the viscosity of conventional dispersions can increase dramatically if no stabilizing agent is used or if too much stabilizing agent is used. Then, the dispersion cannot be used. Thus, it is preferred that the amount of stabilizing agent added is maintained in the range that does not adversely affect the viscosity. While large amounts of stabilizing agent may be used to prevent coagulation or gellation, the large amounts may adversely affect the dispersion by unduly increasing its viscosity. Thus, the amount of stabilizing agent should be carefully controlled to prevent gellation without unnecessarily increasing viscosity. If the viscosity is increased beyond a certain range, then pouring or extruding the dispersion is adversely affected.

In the process of preparing a stabilized alumina dispersion in accordance with the invention, the desired amount of stabilizing agent may be first added to a controlled amount of water at a pH of about 4. The water can contain an electrolyte, such as NaCl up to about 0.1M.

Thereafter, a controlled amount of alumina is added to provide the desired concentration. The mixture is stirred and an acid such as hydrochloric, acetic or formic acid is added to adjust the acidity of the dispersion to a pH in the range of 3 to 6 and preferably a pH in the range of 3.5 to 4.5. The dispersion can be stirred for a period of time and the pH readjusted if necessary.

In another procedure, the alumina may first be added to the water solution containing electrolyte and blended before adding the stabilizing agent.

The present invention has the advantage that it provides alumina dispersions that are stable over a long period of time. For example, an alumina dispersion can have its useful life extended to a period in the range of 1 to 144 hours or more. By comparison without the improved dispersion, sedimentation or gellation can start in 0.25 to 0.5 hour after the dispersion is formed. The improved alumina dispersion appears to reach an equilibrium and thus, once stabilized in accordance with the invention, appears to remain stable for an extended period. Further, the stabilized dispersion has the advantage that its viscosity can be controlled. Thus, pouring and extruding are not adversely affected. In addition, the stabilized dispersion has the advantage that it can be used for catalyst supports and other applications utilizing concentrated alumina dispersions such as anti-slip coatings, binding agents for ceramics, abrasive films, and wash-coated catalyst supports.

Stabilizing agents can inhibit gellation in a dispersion without completely stabilizing the dispersion. Thus, some alumina may coagulate and settle, but the sediment layer does not gel as in dispersions without surfactant. Inhibition of gellation protects against large increases in viscosity over time and allows the alumina to be re-suspended upon stirring. The dispersions can therefore be stored for longer periods of time before being processed.

In the present invention, alumina as referred to herein is an alumina product containing $Al_2O_3$, water of hydration, free water and the like. Such alumina appears to be a dry solid material. The water content may be determined by drying the alumina at 1000° C. Stabilized alumina slurries in water that are suitable for extruding into extrudates contain up to about 32 wt. % $Al_2O_3$, and preferred slurry compositions contain about 10 to about 20 wt. % $Al_2O_3$. Slurry as used herein refers to alumina mixtures with water and stabilizing agents, etc., in varying amounts. The mixtures containing small amounts of alumina are very fluid, and mixtures containing higher amounts of alumina may appear as semi-solid material. Alumina particularly suitable for use as catalyst support materials can have a loose bulk density from about 7.5 to 25 lbs/ft$^3$ preferably 9 to 15 lbs/ft$^3$ surface area from about 260 to 400 m$^2$/g, and a pore volume from about 1 to 2.75 cc/g. Typically, more than 50% of the pore volume consists of pores having pore diameters less than 1000 Å.

Extrudates produced from the stabilized alumina dispersions retain substantially the properties of the starting materials. Extrudates can be prepared having a ⅟32 to ½ inch diameter. Typically, the extrudates are dried at 200° to 300° F. for 4 to 8 hours and then calcined at temperatures ranging from 900° to 2000° F. for 2 to 4 hours to drive off the stabilizing agent and activate the alumina to provide a finished extrudate.

EXAMPLE 1

For purposes of testing the ability to stabilize a dispersion of alumina in water, a 30 ml solution was made comprised of 27.0 ml of 0.01M NaCl electrolyte solution and 3.0 ml of a stabilizing agent solution, designated Dowfax® 3B2 and containing about 3.75 vol. % decyl(sulfophenoxy)benzene sulfonic acid, disodium salt. The solution was stirred vigorously. About 7.2 gms of VERSAL™ 250 alumina (LaRoche Chemicals, Inc., Baton Rouge, La.) having an average particle size of 2 to 3 μm was added to the electrolyte/surfactant solution to provide a dispersion containing 15 wt. % alumina. The acidity of the dispersion was adjusted to a pH of 4 by adding HCl. Thereafter, the dispersion was stirred for about 1 hour and the pH readjusted to 4. After stirring was stopped, the dispersion was inspected after 20 hours, and there was no evidence of settling or formation of sedimentation.

In the same dispersion without the stabilizing agent, a sediment layer started to form 10 to 15 minutes after formation of the dispersion.

EXAMPLE 2

This example compares the settling characteristic of alumina/water dispersions maintained under acidic conditions with and without a stabilizing agent.

Figure 1:
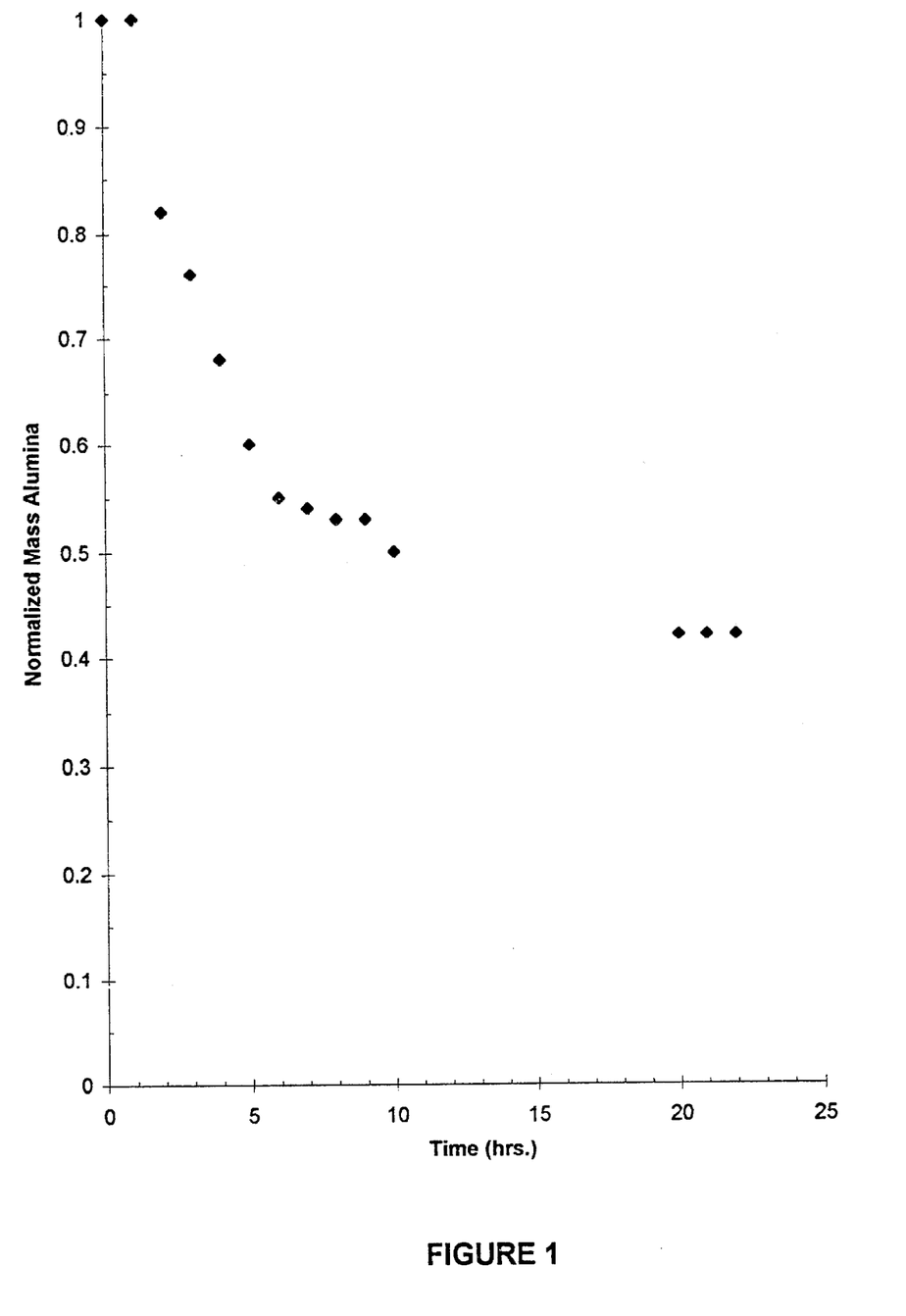
FIG. 1 shows alumina mass removal (plotted against time) from a 15 wt. % alumina dispersion at pH of 4, in 0.01M NaCl electrolyte solution.
Figure 2:
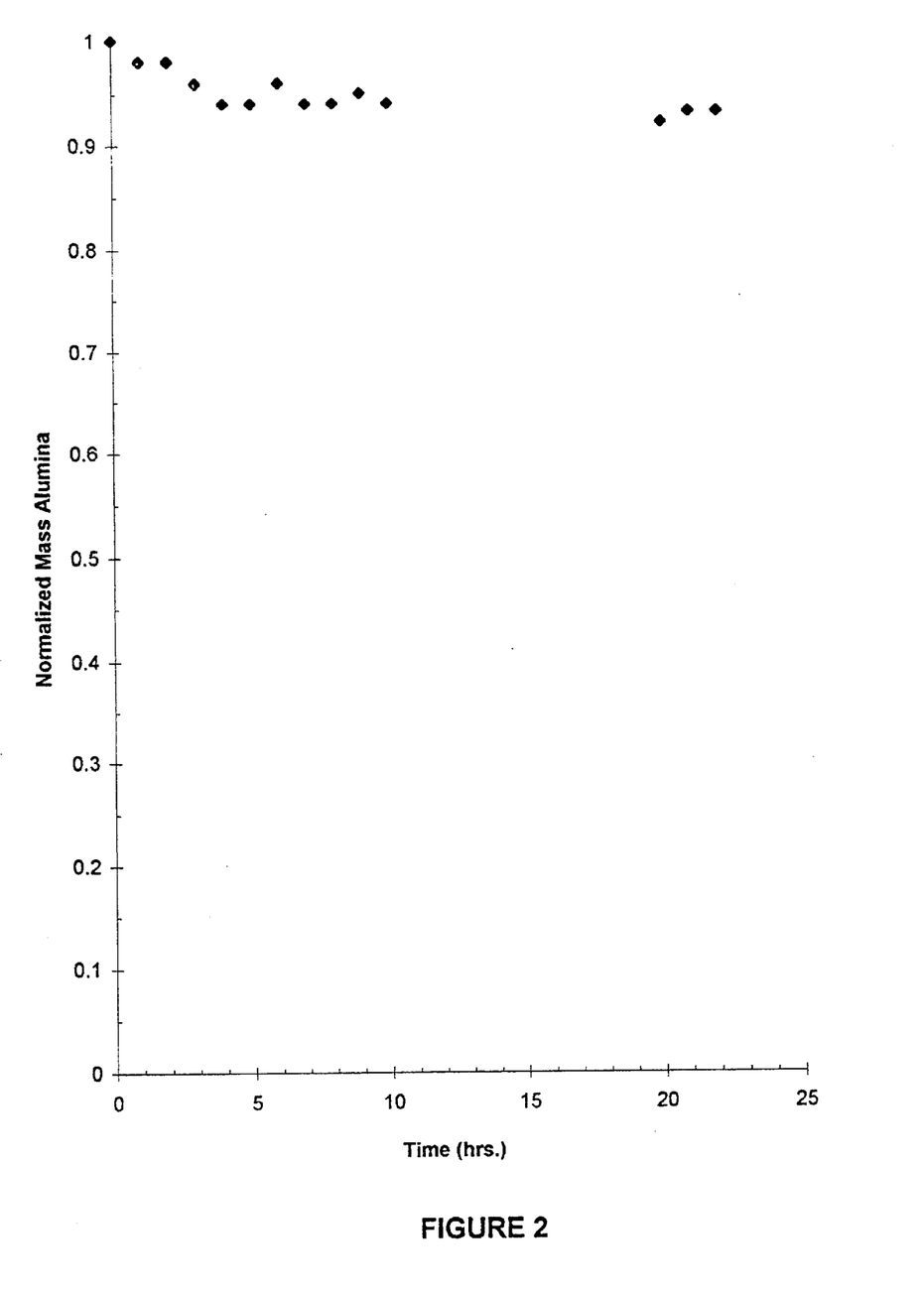
FIG. 2 shows decreased alumina mass removal (plotted against time) from a 15 wt. % alumina dispersion containing $4.8 \times 10^{-5}$ moles stabilizing agent/gm of alumina at pH of 4, in 0.01M NaCl electrolyte solution.

To 393 ml distilled water solution containing 0.01M NaCl electrolyte was added 98.4 gms alumina (VERSAL™ 250 available from LaRoche Chemicals, Inc., Baton Rouge, La.) having an average particle size of 2 to 3 μm to provide a 15% by weight dispersion. After mixing thoroughly, 47 ml of a stabilizing agent solution comprised of 10% by weight Dowfax® 3B2 surfactant in water was added to the dispersion and the pH adjusted to 4 by adding HCl. A second dispersion was prepared as described except a stabilizing agent was not added. Samples (1 ml) were removed from both dispersions each hour up to 10 hours and then at 20, 21 and 22 hours. Each sample was diluted to 100 ml using 0.001M NaCl electrolyte solution at pH 4. After mixing and sonication, the turbidity of each sample was measured using a turbidimeter and alumina mass concentration determined from a calibration curve. The mass of alumina in the samples (normalized to the initial mass, for time=0) was plotted as a function of time to determine the rate of mass removal of alumina. The results are provided in FIG. 1 (no stabilizing agent used) and FIG. 2. It will be seen that FIG. 1 shows a high rate of removal of alumina mass from the dispersion. FIG. 2 shows that the use of a stabilizing agent greatly stabilized the dispersion and the amount of alumina removed after 20 hours was decreased significantly. Thus, it is seen that the use of the stabilizing agent provides a remarkable improvement on the stability of the dispersion.

EXAMPLE 3

For purposes of testing the ability of the Dowfax® 3B2 surfactant to inhibit gellation in unstable dispersions of alumina in water, 30 ml dispersions with different Dowfax® 3B2 surfactant concentrations were prepared by adding 0.1 to 1.0 ml of surfactant stock solutions ($10^{-4}$ to 10% by volume) to 0.01M NaCl electrolyte solution. The solutions were stirred vigorously. About 7.76 gm of VERSAL™ 450 alumina (LaRoche Chemicals, Inc., Baton Rouge, La.) was added to the surfactant/electrolyte solutions to provide dispersions containing 15 wt. % alumina. The pH of each dispersion was adjusted to a pH of 4 using HCl. The dispersions were stirred for about 1 hour and the pH values readjusted to 4. After stirring was stopped, the dispersions were allowed to settle for up to 20 hours. A significant sediment layer developed in each dispersion during this time. However, upon pouring it was evident that these lower doses of surfactant ($1.5 \times 10^{-8}$ to $1.5 \times 10^{-5}$ moles/gm alumina) prevented gellation and related viscosity increase in the sediment layers.

While the invention has been described in terms of preferred embodiments, the claims appended hereto are intended to encompass other embodiments which fall within the spirit of the invention.

What is claimed is:

1. A process for providing an improved catalyst support comprising the steps of:
   (a) providing a dispersion of alumina in water, the dispersion maintained under acidic conditions;
   (b) adding a stabilizing agent to said dispersion, the stabilizing agent capable of stabilizing said dispersion and inhibiting gellation thereof, the stabilizing agent having the formula:

wherein:
X is selected from O (oxygen), S (sulfur), or $NR_1$ wherein N is nitrogen;
$Z_2$ are the atoms necessary to complete a substituted or unsubstituted aryl, carbocyclic or heterocyclic ring;
R and $R_1$ are $C_yH_{2y+1}$, wherein y is an integer from 6 to 16, inclusive, and are branched or unbranched, substituted or unsubstituted;
s and t are individually 0, 1, 2, 3, or 4, wherein at least one of s and t is 1;
n and m are individually 0 or 1; and
$M_a$ and $M_b$ are selected from mono, di, or trivalent metal atoms or hydrogen;
   (c) extruding said stabilized dispersion to provide an extrudate;
   (d) drying said extrudate; and
   (e) firing said dried extrudate to remove the stabilizing agent and to activate said dried extrudate to provide said catalyst support.

2. The process in accordance with claim 1 wherein the stabilizing agent has the formula:

3. The process in accordance with claim 1 wherein the stabilizing agent has the formula:

4. The process in accordance with claim 1 wherein the stabilizing agent has the formula:

5. The process in accordance with claim 1 wherein the stabilizing agent has the formula:

6. The process in accordance with claim 1 wherein the stabilizing agent has the formula:

7. The process in accordance with claim 1 wherein the stabilizing agent has the formula:

8. The process in accordance with claim 1 including the step of providing 1 to 40 wt. % alumina in the dispersion.

9. The process in accordance with claim 1 including the step of providing 10 to 30 wt. % alumina in the dispersion.

10. The process in accordance with claim 1 including the step of maintaining the dispersion in a pH range of 3 to 6.

11. The process in accordance with claim 1 including the step of maintaining the dispersion in a pH range of 3.5 to 4.5.

12. The process in accordance with claim 1 wherein the alumina is selected from pseudo-boehmite, gamma alumina and flash activated alumina.

13. The process in accordance with claim 1 including the step of maintaining the viscosity of the dispersion in the range of 5 to 20 cps.

14. The process in accordance with claim 1 including adding $7 \times 10^{-5}$ to $1 \times 10^{-4}$ moles stabilizing agent per gram of alumina in the dispersion.

15. A process for providing an improved catalyst support comprising the steps of:
  (a) providing a dispersion of alumina in water, the dispersion maintained under acidic conditions;
  (b) adding a stabilizing agent to said dispersion, the stabilizing agent capable of stabilizing said dispersion and inhibiting gellation thereof, the stabilizing agent having the formula:

wherein R is $C_yH_{2y+1}$;
  (c) extruding said stabilized dispersion to provide an extrudate;
  (d) drying said extrudate; and
  (e) firing said dried extrudate to remove the stabilizing agent and to activate said dried extrudate to provide said catalyst support.

16. A process for providing a stabilized alumina dispersion suitable for producing an alumina catalyst support by
  (a) extruding said stabilized dispersion to provide an extrudate;
  (b) drying said extrudate;

(c) firing said dried extrudate to activate said dried extrudate to provide said catalyst support; said stabilized alumina dispersion produced by (d) providing a dispersion of alumina in water, the dispersion maintained under acidic conditions; and (e) adding a stabilizing agent to said dispersion, the stabilizing agent capable of stabilizing said dispersion and inhibiting gellation thereof, the stabilizing agent having the formula:

wherein:

X is selected from O (oxygen), S (sulfur), or $NR_1$ wherein N is nitrogen;

$Z_2$ are the atoms necessary to complete a substituted or unsubstituted aryl, carbocyclic or heterocyclic ring;

R and $R_1$ are $C_yH_{2y+1}$, wherein y is an integer from 6 to 16, inclusive, and are branched or unbranched, substituted or unsubstituted;

s and t are individually 0, 1, 2, 3, or 4, wherein at least one of s and t is 1;

n and m are individually 0 or 1; and $M_a$ and $M_b$ are selected from mono, di, or trivalent metal atoms or hydrogen.

17. A process for providing a stabilized alumina dispersion suitable for producing an alumina catalyst support by

(a) extruding said stabilized dispersion to provide an extrudate;

(b) drying said extrudate;

(c) firing said dried extrudate to activate said dried extrudate to provide said catalyst support; said stabilized alumina dispersion produced by (d) providing a dispersion of alumina in water, the dispersion maintained under acidic conditions;

(e) adding a stabilizing agent to said dispersion, the stabilizing agent capable of stabilizing said dispersion and inhibiting gellation thereof, the stabilizing agent having the formula:

wherein R is $C_yH_{2y+1}$.

18. A process to stabilize and/or inhibit gellation of a water dispersion of alumina to provide a stabilized alumina dispersion, the process comprising the steps of:

(a) providing a dispersion of alumina in water, the dispersion maintained under acidic conditions;

(b) adding a stabilizing agent to said dispersion, the stabilizing agent capable of stabilizing and/or inhibiting gellation of said dispersion and having the formula:

wherein:

X is selected from O (oxygen), S (sulfur), or $NR_1$ wherein N is nitrogen;

$Z_2$ are the atoms necessary to complete a substituted or unsubstituted aryl, carbocyclic or heterocyclic ring;

R and $R_1$ are $C_yH_{2y+1}$, wherein y is an integer from 6 to 16, inclusive, and are branched or unbranched, substituted or unsubstituted;

s and t are individually 0, 1, 2, 3, or 4, wherein at least one of s and t is 1; and n and m are individually 0 or 1; and $M_a$ and $M_b$ are selected from mono, di, or trivalent metal atoms or hydrogen.

19. A process to stabilize and/or inhibit gellation of a water dispersion of alumina, the dispersion suitable for forming into a catalyst support comprising the steps of:

(a) providing a dispersion of alumina in water, the dispersion maintained at a pH in the range of 3 to 6;

(b) adding a stabilizing agent to said dispersion, the stabilizing agent capable of stabilizing and/or inhibiting gellation of said dispersion and having the formula:

wherein:

R is $C_yH_{2y+1}$, and y is an integer from 6 to 16, inclusive, and may be branched or unbranched, substituted or unsubstituted.

20. The process in accordance with claim 19 including maintaining the dispersion in a viscosity range of 5 to 20 cps.

21. The process in accordance with claim 20 including the step of providing 10 to 30 wt. % alumina in the dispersion.

22. The process in accordance with claim 18 including adding $1.5 \times 10^{-8}$ to $1.5 \times 10^{-5}$ moles of stabilizing agent per gram of alumina in the dispersion to inhibit gellation in a sediment layer thereby enabling redispersion of said layer.

23. The process in accordance with claim 19 including adding $7\times10^{-5}$ to $1\times10^{-4}$ moles of stabilizing agent per gram of alumina to stabilize and inhibit gellation in the dispersion.

24. The process in accordance with claim 19 including adding $1.5\times10^{-8}$ to $1.5\times10^{-5}$ moles of stabilizing agent per gram of alumina in the dispersion to inhibit gellation in a sediment layer thereby enabling redispersion of said layer.

* * * * *